US012614998B2

(12) United States Patent
Morsy et al.

(10) Patent No.: US 12,614,998 B2
(45) Date of Patent: Apr. 28, 2026

(54) SYSTEM FOR MULTI-VARIABLE FLUX MEMORY MOTOR CONFIGURATION

(71) Applicant: Jacobi Motors, LLC, Webster, TX (US)

(72) Inventors: Ahmed Salah Morsy, Sugar Land, TX (US); Chaitanya Kumar Ravipalli, Richmond, TX (US); Pierre-Olivier Gourmelon, Sugar Land, TX (US); Nathan Rukavina, Pearland, TX (US)

(73) Assignee: Jacobi Motors, LLC, Missouri City, TX (US)

( * ) Notice: Subject to any disclaimer, the term of this patent is extended or adjusted under 35 U.S.C. 154(b) by 149 days.

(21) Appl. No.: 18/594,430

(22) Filed: Mar. 4, 2024

(65) Prior Publication Data

US 2025/0279739 A1     Sep. 4, 2025

(51) Int. Cl.
*H02P 21/22*          (2016.01)
*H02P 5/74*           (2006.01)

(52) U.S. Cl.
CPC ................. *H02P 21/22* (2016.02); *H02P 5/74* (2013.01); *H02P 2207/05* (2013.01)

(58) Field of Classification Search
CPC ......... H02P 21/22; H02P 2207/05; H02P 5/74
See application file for complete search history.

(56) References Cited

U.S. PATENT DOCUMENTS

| | | | |
|---|---|---|---|
| 3,412,257 A | 11/1968 | Miller et al. | |
| 5,925,965 A | 7/1999 | Li et al. | |
| 6,373,162 B1 | 4/2002 | Liang et al. | |
| 6,591,925 B2 | 7/2003 | Raftari et al. | |
| 6,800,977 B1 | 10/2004 | Ostovic | |
| 6,983,897 B2 | 1/2006 | Kulovits et al. | |
| 7,592,766 B2 | 9/2009 | Patel et al. | |
| 7,597,169 B2 | 10/2009 | Borroni-Bird et al. | |
| 7,598,645 B2 | 10/2009 | Ley et al. | |
| 8,217,546 B2 | 7/2012 | Thomas | |

(Continued)

FOREIGN PATENT DOCUMENTS

| | | |
|---|---|---|
| CN | 101232205 A | 7/2008 |
| CN | 103683633 A | 3/2014 |

(Continued)

OTHER PUBLICATIONS

Guangyuan Qiao et al., "Analysis of Magnetic Properties of AlNiCo and Magnetization State Estimation in Variable-Flux PMSMs", IEEE Transactions on Magnetics, vol. 55, Mar. 10, 2019, Total pp. 06.

(Continued)

*Primary Examiner* — Thai T Dinh
(74) *Attorney, Agent, or Firm* — David L. Cohen

(57) ABSTRACT

A system for multi-Variable Flux Memory Motor (VFMM) configuration includes a set of VFMMs connected to one or more drivetrains, the set of VFMMs being configured to convert kinetic energy of the one or more drivetrains into electric power or vice-versa. The system includes a controller configured to selectively change a magnetization state of one or more VFMMs from the set of VFMMs based on power requirements. The system changes the magnetization state of the set of VFMMs based on an optimal magnetization configuration determined for each power requirement.

18 Claims, 6 Drawing Sheets

(56) References Cited

U.S. PATENT DOCUMENTS

| | | | |
|---|---|---|---|
| 8,330,404 | B2 | 12/2012 | Sakai et al. |
| 8,860,356 | B2 | 10/2014 | Yuuki et al. |
| 8,884,576 | B2 | 11/2014 | Yuuki et al. |
| 9,054,566 | B2 | 6/2015 | Woolmer |
| 9,071,117 | B2 | 6/2015 | Woolmer |
| 9,287,755 | B2 | 3/2016 | Woolmer et al. |
| 9,306,423 | B2 | 4/2016 | Jang et al. |
| 9,496,776 | B2 | 11/2016 | Woolmer et al. |
| 9,614,417 | B2 | 4/2017 | Lee |
| 9,692,265 | B2 | 6/2017 | Kato et al. |
| 10,044,237 | B2 | 8/2018 | Woolmer et al. |
| 10,050,480 | B2 | 8/2018 | Köhler et al. |
| 10,063,180 | B2 | 8/2018 | Wang et al. |
| 10,069,385 | B2 | 9/2018 | King et al. |
| 10,069,388 | B2 | 9/2018 | Court et al. |
| 10,224,786 | B2 | 3/2019 | Woolmer et al. |
| 10,566,866 | B2 | 2/2020 | Woolmer |
| 10,608,490 | B2 | 3/2020 | Woolmer et al. |
| 10,608,512 | B2 | 3/2020 | Woolmer et al. |
| 10,630,157 | B2 | 4/2020 | Mccaw |
| 10,826,338 | B2 | 11/2020 | Woolmer et al. |
| 10,848,014 | B2 | 11/2020 | Radford et al. |
| 10,951,075 | B2 | 3/2021 | Woolmer |
| 11,035,458 | B2 | 6/2021 | Vu et al. |
| 11,078,989 | B2 | 8/2021 | Yan et al. |
| 11,146,127 | B2 | 10/2021 | Vu et al. |
| 11,211,845 | B2 | 12/2021 | Yan et al. |
| 11,303,166 | B2 | 4/2022 | Yan et al. |
| 11,342,810 | B2 | 5/2022 | Woolmer |
| 11,387,710 | B2 | 7/2022 | Vansompel et al. |
| 11,479,107 | B2 | 10/2022 | Payne et al. |
| 11,552,516 | B2 | 1/2023 | Kim |
| 11,757,383 | B2 | 9/2023 | Lim et al. |
| 11,804,354 | B2 | 10/2023 | Loesch et al. |
| 11,936,240 | B2 | 3/2024 | Leijnen |
| 11,936,256 | B2* | 3/2024 | Radford ................. H02K 21/12 |
| 12,040,668 | B2 | 7/2024 | Woolmer et al. |
| 12,057,749 | B2 | 8/2024 | Hillman et al. |
| 12,062,944 | B2 | 8/2024 | Echle et al. |
| 12,062,957 | B2 | 8/2024 | Hillman et al. |
| 12,088,182 | B2 | 9/2024 | Echle et al. |
| 12,119,709 | B2 | 10/2024 | Echle et al. |
| 12,126,297 | B2* | 10/2024 | Radford ................... H02P 6/10 |
| 2006/0170301 | A1 | 8/2006 | Masuzawa et al. |
| 2008/0292691 | A1 | 11/2008 | Lloyd |
| 2009/0261774 | A1* | 10/2009 | Yuuki ................. H02K 1/2766 |
| | | | 310/156.01 |
| 2010/0327787 | A1 | 12/2010 | Sakai et al. |
| 2011/0248594 | A1 | 10/2011 | Thomas |
| 2012/0217834 | A1 | 8/2012 | Lutz et al. |
| 2013/0187492 | A1 | 7/2013 | Woolmer |
| 2013/0334991 | A1 | 12/2013 | Yuuki et al. |
| 2014/0341764 | A1 | 11/2014 | Müller |
| 2014/0377101 | A1 | 12/2014 | Müller |
| 2015/0004032 | A1 | 1/2015 | Müller |
| 2015/0030479 | A1 | 1/2015 | Müller |
| 2015/0069876 | A1 | 3/2015 | Jang et al. |
| 2015/0322957 | A1 | 11/2015 | Müller |
| 2015/0340915 | A1 | 11/2015 | Kato et al. |
| 2016/0172947 | A1 | 6/2016 | Kusakabe |
| 2016/0344242 | A1 | 11/2016 | Jang et al. |
| 2017/0279392 | A1 | 9/2017 | Fukushige et al. |
| 2019/0173336 | A1 | 6/2019 | Takeuchi et al. |
| 2019/0207492 | A1 | 7/2019 | Lin et al. |
| 2019/0296594 | A1 | 9/2019 | Nashiki |
| 2020/0014289 | A1 | 1/2020 | Ko et al. |
| 2020/0195096 | A1 | 6/2020 | Loesch et al. |
| 2020/0328632 | A1 | 10/2020 | Radford et al. |
| 2021/0265880 | A1 | 8/2021 | Shinji et al. |
| 2021/0336519 | A1 | 10/2021 | Radford et al. |
| 2022/0006358 | A1 | 1/2022 | Takahashi et al. |
| 2022/0200423 | A1 | 6/2022 | Woolmer et al. |
| 2022/0286001 | A1 | 9/2022 | Leijnen |
| 2022/0368190 | A1 | 11/2022 | Laber et al. |
| 2022/0407374 | A1* | 12/2022 | Radford ............... H02K 1/2766 |

| | | | |
|---|---|---|---|
| 2023/0014696 | A1 | 1/2023 | Manke et al. |
| 2023/0083131 | A1 | 3/2023 | Choi et al. |
| 2023/0223878 | A1 | 7/2023 | Woolmer et al. |
| 2023/0299651 | A1 | 9/2023 | Kolehmainen et al. |
| 2023/0344374 | A1* | 10/2023 | Chang ..................... H02P 21/22 |
| 2023/0361635 | A1 | 11/2023 | Senti et al. |
| 2023/0361646 | A1 | 11/2023 | Moser |
| 2023/0361659 | A1 | 11/2023 | Kolehmainen |
| 2023/0412057 | A1 | 12/2023 | Jang et al. |
| 2024/0014705 | A1 | 1/2024 | Reh et al. |
| 2024/0055912 | A1 | 2/2024 | Kolehmainen |
| 2024/0055921 | A1 | 2/2024 | Kolehmainen |
| 2024/0088765 | A1 | 3/2024 | Leijnen |
| 2024/0097520 | A1 | 3/2024 | Wu et al. |
| 2024/0097522 | A1 | 3/2024 | Peres De Oliveira et al. |
| 2024/0106285 | A1 | 3/2024 | Lee et al. |
| 2024/0106308 | A1 | 3/2024 | Woolmer et al. |
| 2024/0128810 | A1 | 4/2024 | Hong et al. |
| 2024/0146226 | A1* | 5/2024 | Radford ................... H02P 5/68 |
| 2024/0154481 | A1 | 5/2024 | Duhaut et al. |
| 2024/0195245 | A1 | 6/2024 | Odling et al. |
| 2024/0195272 | A1 | 6/2024 | Kolehmainen |
| 2024/0204597 | A1 | 6/2024 | Schmolke et al. |
| 2024/0250565 | A1 | 7/2024 | Kolehmainen |
| 2024/0250567 | A1 | 7/2024 | Horvath et al. |
| 2024/0258846 | A1 | 8/2024 | Metz |
| 2024/0258853 | A1 | 8/2024 | Steingass et al. |
| 2024/0275248 | A1 | 8/2024 | Fuchslocher et al. |
| 2024/0284631 | A1 | 8/2024 | Brinkhaus et al. |
| 2024/0344599 | A1 | 10/2024 | Schilder et al. |
| 2024/0348134 | A1 | 10/2024 | Fuchslocher et al. |
| 2024/0351417 | A1 | 10/2024 | Schilder et al. |

FOREIGN PATENT DOCUMENTS

| | | |
|---|---|---|
| CN | 109586508 A | 4/2019 |
| CN | 110995085 B | 6/2021 |
| CN | 109586534 B | 8/2021 |
| CN | 110099717 B | 11/2021 |
| CN | 215010005 U | 12/2021 |
| CN | 112234894 B | 3/2022 |
| CN | 114337172 A | 4/2022 |
| CN | 112910130 B | 7/2022 |
| CN | 114765388 A | 7/2022 |
| CN | 114928277 A | 8/2022 |
| CN | 111756145 B | 9/2022 |
| CN | 113964981 B | 10/2022 |
| CN | 115347834 A | 11/2022 |
| CN | 112928956 B | 12/2022 |
| CN | 217984782 U | 12/2022 |
| CN | 218040947 U | 12/2022 |
| CN | 218335697 U | 1/2023 |
| CN | 109684775 B | 3/2023 |
| CN | 115864771 A | 3/2023 |
| CN | 116317248 A | 6/2023 |
| CN | 116345745 A | 6/2023 |
| CN | 113783391 B | 7/2023 |
| CN | 116526793 A | 8/2023 |
| CN | 117239969 B | 3/2024 |
| CN | 117674521 A | 3/2024 |
| CN | 117728643 A | 3/2024 |
| CN | 110739821 B | 4/2024 |
| CN | 112688526 B | 4/2024 |
| CN | 117856480 A | 4/2024 |
| CN | 117955269 A | 4/2024 |
| CN | 220929692 U | 5/2024 |
| CN | 118372627 A | 7/2024 |
| DE | 102006006824 A1 | 8/2007 |
| DE | 102014211662 A1 | 12/2015 |
| DE | 102014222121 A1 | 5/2016 |
| DE | 102014225985 A1 | 6/2016 |
| DE | 102015202988 A1 | 8/2016 |
| DE | 102015204721 A1 | 9/2016 |
| DE | 102015213678 A1 | 1/2017 |
| DE | 102016203140 A1 | 8/2017 |
| DE | 102017206641 A1 | 10/2018 |
| DE | 102018216967 A1 | 4/2020 |
| DE | 102020004916 A1 | 10/2020 |
| DE | 102021002939 A1 | 7/2021 |

(56)  References Cited

FOREIGN PATENT DOCUMENTS

| | | | |
|---|---|---|---|
| DE | 102021002941 A1 | 7/2021 |
| DE | 102021002966 A1 | 7/2021 |
| DE | 102020109388 A1 | 10/2021 |
| DE | 102020123345 A1 | 3/2022 |
| DE | 102022001408 A1 | 6/2022 |
| DE | 102021002466 A1 | 11/2022 |
| DE | 102022004792 A1 | 2/2023 |
| DE | 102022004794 A1 | 2/2023 |
| DE | 102022004846 A1 | 2/2023 |
| DE | 102021125982 A1 | 4/2023 |
| DE | 102021130152 A1 | 5/2023 |
| DE | 102021006602 A1 | 6/2023 |
| DE | 102022104375 B4 | 11/2023 |
| DE | 102022205515 A1 | 11/2023 |
| DE | 102022116945 A1 | 1/2024 |
| DE | 102022210416 A1 | 4/2024 |
| DE | 102022004616 A1 | 6/2024 |
| DE | 102022004618 A1 | 6/2024 |
| DE | 102022004622 A1 | 6/2024 |
| DE | 102022004793 A1 | 6/2024 |
| DE | 102023102144 A1 | 8/2024 |
| DE | 102022101633 B4 | 9/2024 |
| DE | 102023107495 A1 | 9/2024 |
| DE | 102023202494 A1 | 9/2024 |
| EP | 2133982 A2 | 12/2009 |
| EP | 2378633 A1 | 10/2011 |
| EP | 2773023 A1 | 9/2014 |
| EP | 3032718 A1 | 6/2016 |
| EP | 3091640 A1 | 11/2016 |
| EP | 2975731 B1 | 2/2018 |
| EP | 2822150 B1 | 10/2019 |
| EP | 3561999 A1 | 10/2019 |
| EP | 3929951 A1 | 12/2021 |
| EP | 3561999 B1 | 1/2024 |
| EP | 3793062 B1 | 5/2024 |
| EP | 4311078 B1 | 7/2024 |
| EP | 4404433 A1 | 7/2024 |
| EP | 4443711 A1 | 10/2024 |
| FR | 2882202 B1 | 7/2007 |
| FR | 3004025 B1 | 3/2015 |
| FR | 3006124 B1 | 5/2015 |
| FR | 3014255 B1 | 1/2016 |
| FR | 2996377 B1 | 7/2016 |
| FR | 2999359 B1 | 7/2016 |
| FR | 3023995 B1 | 8/2016 |
| FR | 3004599 B1 | 10/2016 |
| FR | 3028687 B1 | 1/2018 |
| FR | 3027468 B1 | 5/2019 |
| FR | 3059169 B1 | 8/2022 |
| FR | 3127343 A1 | 3/2023 |
| FR | 3132990 A1 | 8/2023 |
| FR | 3123264 B1 | 10/2023 |
| FR | 3143899 A1 | 6/2024 |
| FR | 3143900 A1 | 6/2024 |
| FR | 3144441 A1 | 6/2024 |
| GB | 2284104 A | 5/1995 |
| GB | 2598007 B | 3/2023 |
| GB | 2627783 A | 9/2024 |
| JP | H02223342 A | 9/1990 |
| JP | H04238005 A | 8/1992 |
| JP | H11168867 A | 6/1999 |
| JP | 2009017694 A | 1/2009 |
| JP | 4337989 A | 9/2009 |
| JP | 4337989 B1 | 9/2009 |
| JP | 2010220400 A | 9/2010 |
| JP | 2013106388 A | 5/2013 |
| JP | 2013106480 A | 5/2013 |
| JP | 2014150638 A | 8/2014 |
| JP | 2014168331 A | 9/2014 |
| JP | 2017200437 A | 11/2017 |
| JP | 6524818 B2 | 6/2019 |
| JP | 6729037 B2 | 7/2020 |
| JP | 6790760 B2 | 11/2020 |
| JP | 6848390 B2 | 3/2021 |
| JP | 6917263 B2 | 8/2021 |

| | | | | |
|---|---|---|---|---|
| JP | 6917264 B2 | 8/2021 |
| JP | 7055001 B2 | 4/2022 |
| JP | 2023121030 A | 8/2023 |
| JP | 7458699 B2 | 4/2024 |
| KR | 100580524 B1 | 5/2006 |
| KR | 20140084494 A | 7/2014 |
| KR | 101437546 B1 | 9/2014 |
| KR | 20140118197 A | 10/2014 |
| KR | 20140118203 A | 10/2014 |
| KR | 20140118204 A | 10/2014 |
| KR | 20140119302 A | 10/2014 |
| KR | 20140119304 A | 10/2014 |
| KR | 20150004065 A | 1/2015 |
| KR | 20150019028 A | 2/2015 |
| KR | 20150019057 A | 2/2015 |
| KR | 20160021532 A | 2/2016 |
| KR | 101765581 B1 | 8/2017 |
| KR | 101999860 B1 | 7/2019 |
| KR | 102299449 B1 | 9/2021 |
| KR | 20240083596 A | 6/2024 |
| KR | 20240119616 A | 8/2024 |
| WO | 2004088819 A1 | 10/2004 |
| WO | 2007093233 A1 | 8/2007 |
| WO | 2008062543 A1 | 5/2008 |
| WO | 2013002658 A2 | 1/2013 |
| WO | 2014003730 A1 | 1/2014 |
| WO | 2016005081 A1 | 1/2016 |
| WO | 2017220939 A1 | 12/2017 |
| WO | 2018188948 A1 | 10/2018 |
| WO | 2020078667 A1 | 4/2020 |
| WO | 2020210495 A1 | 10/2020 |
| WO | 2020233936 A1 | 11/2020 |
| WO | 2021081372 A1 | 4/2021 |
| WO | 2021083783 A1 | 5/2021 |
| WO | 2021083784 A1 | 5/2021 |
| WO | 2021176058 A1 | 9/2021 |
| WO | 2022023062 A1 | 2/2022 |
| WO | 2022023139 A1 | 2/2022 |
| WO | 2022023144 A1 | 2/2022 |
| WO | 2022023145 A1 | 2/2022 |
| WO | 2022023146 A1 | 2/2022 |
| WO | 2022023153 A1 | 2/2022 |
| WO | 2022023154 A1 | 2/2022 |
| WO | 2022023158 A2 | 2/2022 |
| WO | 2022023159 A1 | 2/2022 |
| WO | 2022064725 A1 | 3/2022 |
| WO | 2022064726 A1 | 3/2022 |
| WO | WO-2022046772 A1 * | 3/2022 | ............... H02P 9/00 |
| WO | 2022069500 A1 | 4/2022 |
| WO | 2022128550 A1 | 6/2022 |
| WO | 2022258314 A1 | 12/2022 |
| WO | 2023001504 A1 | 1/2023 |
| WO | 2023016763 A1 | 2/2023 |
| WO | 2023020863 A1 | 2/2023 |
| WO | 2023078922 A1 | 5/2023 |
| WO | 2023094626 A1 | 6/2023 |
| WO | 2023104480 A1 | 6/2023 |
| WO | 2023104672 A1 | 6/2023 |
| WO | 2023126237 A1 | 7/2023 |
| WO | 2023126353 A1 | 7/2023 |
| WO | 2023126354 A1 | 7/2023 |
| WO | 2023135251 A1 | 7/2023 |
| WO | 2023135252 A1 | 7/2023 |
| WO | 2023165972 A1 | 9/2023 |
| WO | 2023186744 A1 | 10/2023 |
| WO | 2023186859 A1 | 10/2023 |
| WO | 2023194124 A1 | 10/2023 |
| WO | 2023198521 A1 | 10/2023 |
| WO | 2023227297 A1 | 11/2023 |
| WO | 2024003495 A1 | 1/2024 |
| WO | 2024012848 A1 | 1/2024 |
| WO | 2024022675 A1 | 2/2024 |
| WO | 2024027989 A1 | 2/2024 |
| WO | 2024028133 A1 | 2/2024 |
| WO | 2024033235 A1 | 2/2024 |
| WO | 2024046750 A1 | 3/2024 |
| WO | 2024110654 A1 | 5/2024 |
| WO | 2024120778 A1 | 6/2024 |
| WO | 2024120977 A1 | 6/2024 |

(56)  References Cited

FOREIGN PATENT DOCUMENTS

| | | |
|---|---|---|
| WO | 2024120979 A1 | 6/2024 |
| WO | 2024121489 A1 | 6/2024 |
| WO | 2024132451 A1 | 6/2024 |
| WO | 2024132599 A1 | 6/2024 |
| WO | 2024132600 A1 | 6/2024 |
| WO | 2024132602 A1 | 6/2024 |
| WO | 2024141222 A1 | 7/2024 |
| WO | 2024149678 A1 | 7/2024 |
| WO | 2024175327 A1 | 8/2024 |
| WO | 2024189277 A1 | 9/2024 |
| WO | 2024199787 A1 | 10/2024 |
| WO | 2024199815 A1 | 10/2024 |
| WO | 2024199816 A1 | 10/2024 |
| WO | 2024199838 A1 | 10/2024 |
| WO | 2024213316 A1 | 10/2024 |

OTHER PUBLICATIONS

Hui Yang et al., "Investigation of magnetization characteristics of variable flux PM based on a Fourier-fitting hysteresis model", AIP Advances 9, 095056-1-9, Sep. 26, 2019, Total pp. 10.

Apoorva Athavale et al., "Enabling Driving Cycle Loss Reduction in Variable Flux PMSMs Via Closed-Loop Magnetization State Control", IEEE transactions on industry applications, 1932-1939, Oct. 1, 2017, Total pp. 08.

Dean J. Patterson et al., "A comparison of radial and axial flux structures in electrical machines", 2009 IEEE International Electric Machines and Drives Conference, Jun. 16, 2009, Total pp. 07.

Daan Moreels et al., "This Inside-Out Motor for Evs is Power Dense and (Finally) Practical", IEEE Spectrum, Sep. 30, 2019, Total pp. 20.

Bex Sun, "Axial Flux vs Radial Flux: 4 Reasons Why Axial Flux Machines have a Higher Power Density", LinkedIn, Jul. 17, 2019, Total pp. 05.

Chirag Desai et al., "Back EMF, Torque-Angle, and Core Loss Characterization of a Variable-Flux Permanent-Magnet Machine", IEEE Transactions on Transportation Electrification, vol. 5, No. 2, Feb. 21, 2019, Total pp. 14.

International Search Report, PCT/US2021/012938, mailed May 11, 2021, Total pp. 04.

International Search Report, PCT/US2020/027473, mailed Aug. 17, 2020, Total pp. 05.

International Search Report, PCT/US2021/028869, mailed Aug. 3, 2021, Total pp. 04.

International Search Report, PCT/US2020/057140, mailed Feb. 11, 2021, Total pp. 04.

Huang Jia et al., "Vaiable flux Memory Motors: A Review", 2014 IEEE Conference and Expo Transportation Electrification Asia-Pacific, 2014, Total pp. 06.

Lee Teschler, "Innovative electric motors sport axial designs", Designworld, May 25, 2024, Total pp. 05.

Tao Li et al., "Multiphysics Analysis of an Axial-Flux In-Wheel Motor With an Amorphous Alloy Stator", IEEE Access, vol. 8, 27414-27425, Feb. 6, 2020, Total pp. 12.

Written Opinion of the International Searching Authority, PCT/US2021/012938, mailed May 11, 2021, Total pp. 08.

Written Opinion of the International Searching Authority, PCT/US2021/028869, mailed Aug. 3, 2021, Total pp. 09.

Written Opinion of the International Searching Authority, PCT/US2020/057140, mailed Feb. 11, 2021, Total pp. 11.

Hai Xu et al., "Design of a Hybrid Magnets Variable Flux Memory Machine Based on Hysteresis Model", 2019 IEEE International Electric Machines & Drives Conference (IEMDC), 1889-1894, May 12-15, 2019, Total pp. 06.

J. Huang, et al.; "Variable flux Memory Motor: A Review"; 2014 IEEE Conference and Expo Transportation Electrification Asia-Pacific, pp. 1-6; Aug. 31, 2014 (6 pages).

International Search Report for corresponding International Application No. PCT/US2020/027473, mailed Aug. 17, 2020 (20 pages).

Written Opinion issued in International Application No. PCT/US2021/028869; Dated Aug. 3, 2021 (12 pages).

"Analysis of Magnetic Properties of AlNiCo and Magnetization State Estimation in Variable-Flux PMSMs", IEE Transactions on Magnetics, vol. 55, No. 7, Jul. 2019.

Xu Hai et al, "Design of a Hybrid Magnets Variable Flux Memory Machine Based on Hysteresis Model", 2019 IEEE International Electric Machines & Drives Conference (IEMDC), IEEE, May 12, 2019 (May 12, 2019), p. 1889-1894, XP033588597.

International Search Report issued in corresponding International Patent Application No. PCT/US2021/012938 dated Way 11, 2021 (4 pages).

Written Opinion issued in corresponding International Patent Application No. PCT/US2021/012938 dated May 11, 2021 (8 pages).

"Investigation of magnetization characteristics of variable flux PM based on a Fourier-fitting hysteresis model", AIP Advances 9, 095059 (2019); https://doi.org/10.1063/1.1522766.

International Search Report issued in International Application No. PCT/US2021/028869, mailed Aug. 3, 2021 (5 Pages).

International Search Report issued in PCT/US2020/057140 on Feb. 11, 2021 (4 pages).

Written Opinion of the International Searching Authority issued in PCT/US2020/057140 on Feb. 11, 2021 (11 Pages).

Athavale, A. et al.; "Enabling Driving Cycle Loss Reduction in Variable Flux PMSMs via Closed-loop Magnetization State Control"; IEEE, Oct. 1, 2017, pp. 1932-1939 (8 pages).

Desai, C.; "Back EMF, Torque-Angle, and Core Loss Characterization of a Variable-Flux Permanent-Magnet Machine"; IEEE Transactions on Transportation Electrification, vol. 5, No. 2, Jun. 1, 2019, pp. 371-384 (14 Pages).

Lee Teschkler "Innovative electric motors sport axial designs" Designworld, Feb. 6, 2019 (5 pages).

D. J. Patterson et al. "A Comparison of Radial and Axial Flux Structures in Electrical Machines" IEEE, International Electric Machines and Drives Conference; 2009 (7 pages).

T. Li et al. "Multiphysics Analysis of an Axial-Flux In-Wheel Motor With an Amorphous Alloy Stator" IEEE Access, vol. 3;Feb. 13, 2020 (12 pages).

D. Moreels et al. "This Inside-Out Motor for EVs is Power Dense and (Finally) Practical" IEEE Spectrum; Sep. 30, 2019 (8 pages).

Daan Moreels "Axial Flux vs Radial Flux: 4 Reasons Why Axial Flux Machines have a Higher Power Density" Magnax; Jan. 31, 2018 (6 pages).

* cited by examiner

300A

300B

300C

400

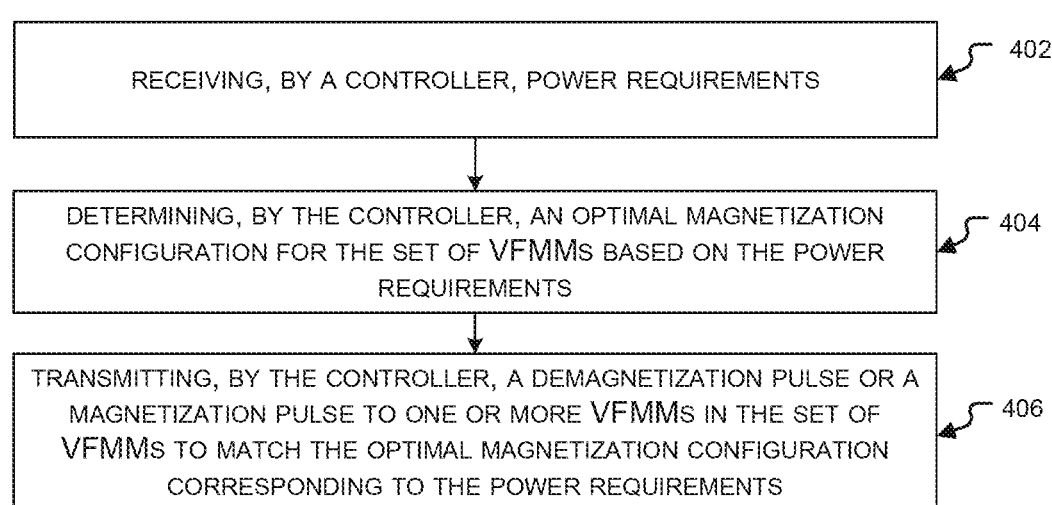

RECEIVING, BY A CONTROLLER, POWER REQUIREMENTS    402

DETERMINING, BY THE CONTROLLER, AN OPTIMAL MAGNETIZATION CONFIGURATION FOR THE SET OF VFMMs BASED ON THE POWER REQUIREMENTS    404

TRANSMITTING, BY THE CONTROLLER, A DEMAGNETIZATION PULSE OR A MAGNETIZATION PULSE TO ONE OR MORE VFMMs IN THE SET OF VFMMs TO MATCH THE OPTIMAL MAGNETIZATION CONFIGURATION CORRESPONDING TO THE POWER REQUIREMENTS    406

FIG. 4

SYSTEM FOR MULTI-VARIABLE FLUX MEMORY MOTOR CONFIGURATION

BACKGROUND

Synchronous electric motors, such as Variable Flux Memory Motors (VFMMs) or Wound Field Synchronous Motors, have a wide range of applications in industrial, commercial, and residential, applications, such as fans, pumps, compressors, elevators, refrigerators, industrial machinery, and electric motor vehicles because of their high efficiencies. Also, because of using permanent magnets instead of windings in the rotors of the synchronous electric motors, there is less need for rotor cooling. These advantages along with others (e.g., being brushless) make the synchronous electric motors popular where high torque, high efficiency, or low maintenance for electric motors is needed.

In many vehicles, a single motor or an engine may be used for driving a drivetrain. Two-wheel drive vehicles typically have the drivetrain connected to a single axle supporting two wheels. Four-wheel drive vehicles, on the other hand, have the drivetrain connected to two axles supporting two wheels each. While some electric vehicles have one motor used for propulsion on one axel, it is still preferable to have multiple motors in drivetrains for improved performance and torque.

It has been observed that vehicles, particularly multi-axle vehicles, benefit from having a plurality of motors that drive the drivetrain. Multiple motors each connected to corresponding drivetrains have shown to be particularly effective in heavy-duty vehicles or performance vehicles. In some solutions, the number of synchronous motors engaged with the corresponding drivetrain is suitably adjusted based on power requirements using axle disconnect mechanisms or clutches.

However, increased weight and rollover losses are known problems associated with multi-motor drivetrains. Some solutions proposed for ameliorating such problems include use of combination of permanent magnet motors and induction motors, or use of the axle disconnect or clutch mechanisms to mechanically engage or disengage motors from the corresponding drivetrain based on requirement. Combining different types of motors (such as internal permanent magnet motors and induction motors) have been found not to provide city driving efficiencies. They also require different manufacturing lines for each type of motor. Further, axle disconnect mechanisms and clutches are implemented as mechanical or electromechanical systems that are susceptible to energy losses, and wear and tear during operation. Such mechanisms are also not acceptably reliable during a fault, and also add to the cost, weight, and complexity of the vehicle.

Additionally, synchronous motors that use permanent magnets may also cause iron, eddy, and copper losses due to the continued magnetized state of the motors, particularly during high-speed operations. Further, engagement and disengagement of the synchronous motors may have to be carefully controlled to optimize for energy efficiency.

Adjusting magnetization states of synchronous motors, such as VFMMs, may allow energy efficiency to be maintained while providing speed and torque outputs within a fixed and preconfigured operating range. The preconfigured operating range within which the VFMM may provide speed and torque outputs may correspond to limitations presented by hardware specifications of the VFMM, such as number of turns in the coils of stator, radius of VFMM, geometry of rotor, and the like. While use of multiple VFMMs may be desirable to further extend the operating range, existing solutions fail to provide means for efficiently coordinating the operation of multiple VFMMs. Further existing solutions do not allow for multiple VFMMs to be controllably engaged with or disengaged from corresponding drivetrains based on speed and torque output required by a user.

Therefore, there is a need for a system for multi-VFMM configuration. Further, there is a need for a system for controllably engaging a plurality of VFMMs to drive corresponding drivetrains based on requirements.

SUMMARY

In an aspect, embodiments of the disclosure are directed towards a system for multi-VFMM configuration. The system includes a set of VFMMs connected to one or more drivetrains, the set of VFMMs being configured to convert kinetic energy of a gear train into electric power or vice-versa. The system includes a controller configured to selectively change a magnetization state of one or more VFMMs from the set of VFMMs based on power requirements.

By selectively changing the magnetization states of the set of VFMMs, the system may allow any combination of VFMMs to drive the drivetrains based on the power requirements. The system may select an optimal magnetization configuration suitable for efficiently fulfilling the power requirements input by the user.

Other aspects of the disclosure will be apparent from the following description and the appended claims.

BRIEF DESCRIPTION OF THE DRAWINGS

FIG. 4 shows a flowchart of a method for controlling a set of VFMMs based on power requirements, according to one or more embodiments of the present disclosure.

DETAILED DESCRIPTION

Figure 1:
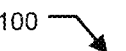
FIG. 1 shows a block diagram of a vehicle having a multi-Variable Flux Memory Motor (VFMM) configuration, according to one or more embodiments.
Figure 1:
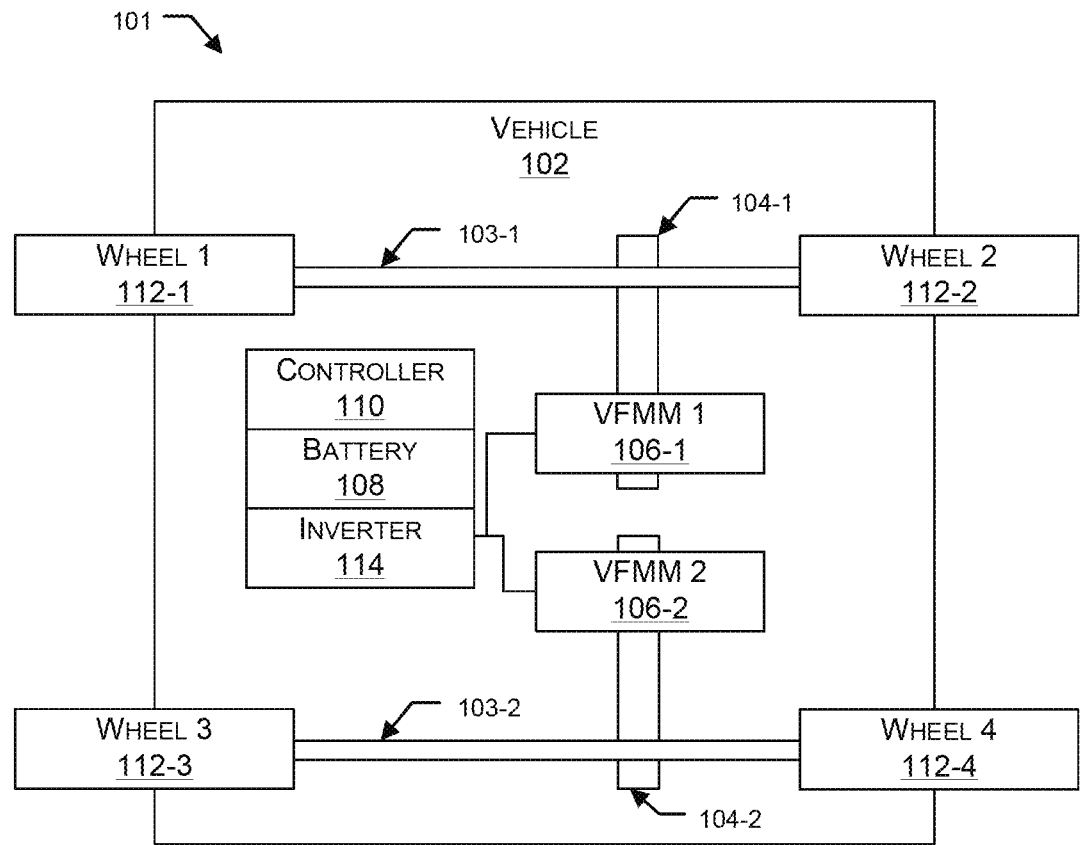

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it would have been apparent to one of ordinary skill in the art that the disclosure may be practiced without these specific details. In other instances, well-known features have not been described in detail to avoid unnecessarily complicating the description.

As used herein, "about" means approximately or nearly, and in the context of a numerical value or range set forth means ±10% of the numeric value.

Referring to FIG. 1, a block diagram (100) of a system (101) for multi-Variable Flux Memory Motor (VFMM) configuration in a vehicle (102) is illustrated. As shown, the system (101) may include a set of VFMMs, such as first and second VFMMs (106-1, 106-2) (collectively referred to as VFMMs (106)). The VFMMs (106) may be configured to drive one or more drivetrains (104-1, 104-2) (collectively referred to as drivetrains (104)). Each VFMM (106) may be connected to a corresponding drivetrain. In some embodiments, the first VFMM (106-1) may be connected to a first drivetrain (104-1) and the second VFMM (106-2) may be connected to a second drivetrain (104-2). In some embodiments, the system (101) includes a controller (110) configured to control magnetization states of the VFMMs (106) based on power requirements. In some embodiments, the system (101) may also include a battery (108) and an inverter (114) configured to supply power to the VFMMs (106).

In some embodiments, the VFMMs (106) may be connected to, and configured to drive, one or more wheels, such as wheels (112-1, 112-2, 112-3, 112-4) (collectively referred to as the wheels (112)). In some embodiments, the VFMMs (106) may be configured to propel the vehicle (102) by turning/rotating the wheels (112). While FIG. 1 describes embodiments where the vehicle (102) is a four-wheeled vehicle, the system (101) may be suitably adapted for implementations thereof in vehicles having any number of wheels. The vehicle (102) may be any one of including, but not be limited to, electric vehicle, hybrid vehicle, and the like. Examples of the vehicle (102) include, but not be limited to, two-wheelers, three-wheelers, cars, vans, trucks, buses, hydraulic vehicles, electric trains, locomotives, boats, ships, submarines, and the like.

In some embodiments, the VFMMs (106) may be connected to the wheels (112) through the drivetrains (104). The drivetrains (104) may be configured to transmit/deliver power from the VFMMs (106) to the corresponding wheels (112). In some embodiments, the drivetrains (104), in turn, may be connected to the wheels (112) through axles (103-1, 103-2) (collectively referred to as axles (103)). In some embodiments, pairs of wheels, viz. the wheels (112-1, 112-2) indicative of front wheels, in some examples, and wheels (112-3, 112-4) indicative of rear wheels, in some examples, may be connected to a corresponding axle, such as axles (103-1, 103-2) respectively. The axles (103) may allow rotation of the drivetrains (104) to be translated into rotation of the corresponding wheels (112). In some embodiments, the drivetrains (104) may be connected to the axles (103) through corresponding differentials (not shown). The differentials may be configured to allow the pairs of wheels (112-1, 112-2), and wheels (112-3, 112-4), to rotate at different rates/speeds/revolutions per minute, such as during turns or to prevent slippages.

In some preferred embodiments, the system (101) may include one or more of the drivetrains (104) connected to the set of VFMMs (106) on one end, and to a corresponding axle from the axles (103) on the other end thereof. In other embodiments, a single drivetrain may be connected to the set of VFMMs (106) and the axles (103). Further, while the present disclosure describes the system (101) in the context of automotive applications, it may be appreciated by those skilled in the art that the system (101) may also be suitably adapted for other non-automotive applications that require a plurality of motors for their operations.

In some embodiments, the VFMMs (106) may be indicative of synchronous electric motors whose flux linkage ($\lambda_m$) may be dynamically, and operably, adjustable. The VFMMs (106) may be a type of synchronous motor in which the magnetization state of rotor magnets thereof may be adjusted (i.e., changed) during an operation of the VFMMs (106). Adjusting magnetization states of the rotor magnets (hereinafter referred to as "VFMM magnetization" or "magnetization state") may correspondingly change the amount of torque or propulsion provided by the VFMMs (106) with respect to the electric power supplied thereto.

In some embodiments, the VFMMs (106) may have a set of phase windings. In some embodiments, the set of phase windings may correspond to the coils on the stator of the VFMMs (106). In some embodiments, the VFMMs (106) may be electrically connected to a power source, such as the battery (108). When the battery (108) supplies electric power to the VFMMs (106), the coils of the stator may produce a magnetic field, which may interact with the magnetic fields of the rotor magnets of a rotor. In such embodiments, the interaction of the magnetic fields may cause the rotor to rotate with respect to the stator, and in-turn cause the wheels (112) connected thereto through the drivetrains (104) to rotate and propel the vehicle (102) in a direction on the transverse plane of the vehicle (102). In some preferred embodiments, the VFMMs (106) may have multi-phase windings to operate with multi-phase electric power supplied from the battery (108) through the inverter (114). In some non-limiting examples, multi-phase windings may be indicative of three-phase windings. In such non-limiting examples, the VFMMs (106) may have either a star connection or a delta connection, but not limited thereto.

According to one or more embodiments, to facilitate the change in the magnetization state of the VFMMs (106), the rotor magnets may be made of a soft-ferromagnetic material including, but not limited to, aluminum nickel cobalt (AlNiCo) or some types of ceramics. Hereinafter, the rotor magnets made of a soft-ferromagnetic material will be referred to as "soft magnets." The soft magnets may be magnets having coercive force less than a coercive force threshold. The soft magnets may be configured to produce magnetomotive forces (mmf) when magnetized. According to one or more embodiments, the soft magnets may be made of AlNiCo with grades 1-9 or magnets made of AlNiCo, cast, ceramics, some grades of samarium cobalt, or sintered construction of these materials. It may be apparent to those skilled in the art that specific amounts of these materials may be used to achieve a desired function of the VFMMs (106). The design, construction, number, and arrangements of the stator, the rotor, and the soft magnets may be suitably adapted based on requirements of the use cases. In some non-limiting examples, the VFMMs (106) may correspond to those provided in patent specifications WO2020210495A1, US20220407374A1, and/or WO2021081372A1.

The VFMMs (106), in accordance with one or more embodiments, may be a better substitute for conventional synchronous motors due to their ability to be variably magnetized and demagnetized based on requirements. In some embodiments, the soft magnets can be quickly and efficiently magnetized and/or demagnetized during, and after, the soft magnets are assembled inside the VFMMs (106). Accordingly, using VFMMs (106) potentially reduces manufacturing costs of electric motor-equipped system (101) due to easier handling of the demagnetized materials, during and after assembly by eliminating need for reconfiguration or replacement of soft-magnets if they are found to be of inappropriate magnetization states.

In some embodiments, the magnetization states of the soft magnets may be changed to any value from about 0% magnetization (i.e., the soft magnets are completely demagnetized) to about 100% magnetization (i.e., the soft magnets are magnetized to their maximum capacity). The change in the magnetization states may occur in a short time span, i.e. in less than about 3 milliseconds. In some embodiments, the magnetization states of the VFMMs (106) may be changed by passing a pulse of current therethrough such that the soft magnets are magnetized or de-magnetized up to the desired level. The magnetization state of the soft magnets may be adjusted by amplitude of the pulse of current. In some embodiments, the pulse of current may be provided to the soft magnets by the battery (108). In some embodiments, the inverter (114) may be connected to a corresponding inverter controller (such as controller (110) described subsequently) that may be configured to adjust the pulse to shift the magnetization state of the soft magnets. In some embodiments, the pulse of current from the battery (108) may be modified or channeled through the inverter (114).

By suitably adjusting the magnetization states of the VFMMs (106), one or more of the VFMMs from the set of VFMMs (106) may be operably engaged or disengaged from providing power to the drivetrains (104). In some embodiments, when the VFMMs (106) (or the rotor magnets thereof) are magnetized, the VFMMs (106) may provide power to the drivetrains (104), and when the VFMMs (106) are demagnetized completely, the VFMMs (106) may be prevented from providing power to the corresponding drivetrain (104). In such embodiments, the demagnetized VFMMs (106) may eliminate rollover losses otherwise experienced with other permanent magnet motors. Further, demagnetizing the VFMMs (106) may allow the rotors to spin freely, thereby preventing iron, eddy, and copper losses at speeds exceeding a predetermined threshold. The predetermined threshold may depend on power required by the users, such as torque and/or speed requirements, as elaborated subsequently in the present disclosure.

In some embodiments, each of the VFMMs (106) may have different operating configurations/specifications. In some embodiments, the configurations/specifications of the VFMMs (106) include, but not be limited to, number of turns on coils associated therewith, sizes and geometry of the rotor with respect to the stator, material composition of the rotors, and the like. Each VFMM from the set of VFMMs (106) may have a different specification that is optimized to operate at a corresponding power and/or speed requirements, or fit the requirements of a desired drive cycle. In some embodiments, a first subset of VFMMs may be defined to provide torque higher than a torque capacity value, but speed lower than a speed capacity value. Further, in such embodiments, a second subset of VFMMs may be defined to provide torque less than the torque capacity threshold, but speed higher than the speed capacity threshold. In some examples, the first VFMM (106-1) may have optimized specifications for operation in comparatively low-speed, high-torque situations, such as during acceleration or uphill climbs, and the second VFMM (106-2) may have optimized specifications for comparatively high-speed, low-torque situations, such as while driving on a freeway. Having VFMMs (106) with different specifications may allow the system (101) to be operable at optimal efficiency in a plurality of power requirements.

In some embodiments, the VFMMs (106) may receive power from the power source (203). The power source (203) may be any one or combination of including, but not limited to, batteries (such as battery 108), power outlets connected to a power grid, solar panels, hydrogen fuel cells, generators, and the like. In some embodiments, the battery (108) may be made of any one or combination of including, but not limited to, lithium-ion, lithium-ion polymer, nickel metal hydride, nickel cadmium, nickel hydrogen, nickel-zinc, silver zinc, and the like. In some embodiments, the power source (203) may be indicative of one or more of the battery (108)

forming a battery stack. In some embodiments, the power source (203) may be connected to the VFMMs (106) in series or in parallel. In some embodiments, the power source (203) may be electrically connected directly to the VFMMs (106), or through the inverter (114).

In some embodiments, the one or more inverters (114) may be configured between the battery (108) and the set of VFMMs (106), and may be configured to allow the electric power to pass therebetween. The inverters (114) may convert the electric power indicative of Direct Current (DC) to Alternating Current (AC) from the battery (108), and supply the electric power to the VFMMs (106). In some embodiments, the inverters (114) may be configured to modulate the frequency of the AC based on the speed requirements. In some embodiments, the inverters (114) may be a multiphase inverter. In an example, the multi-phase inverter may be a three-phase inverter. In other examples, the multi-phase inverter may be an inverter having more than one phase. In some embodiments, the inverters (114) may electrically connect the VFMMs (106) and the battery (108). In some embodiments, the inverters (114) may be used for remagnetizing the soft magnets in the VFMMs (106) by controllably passing a pulse of electric current through the VFMMs (106).

Figure 2:
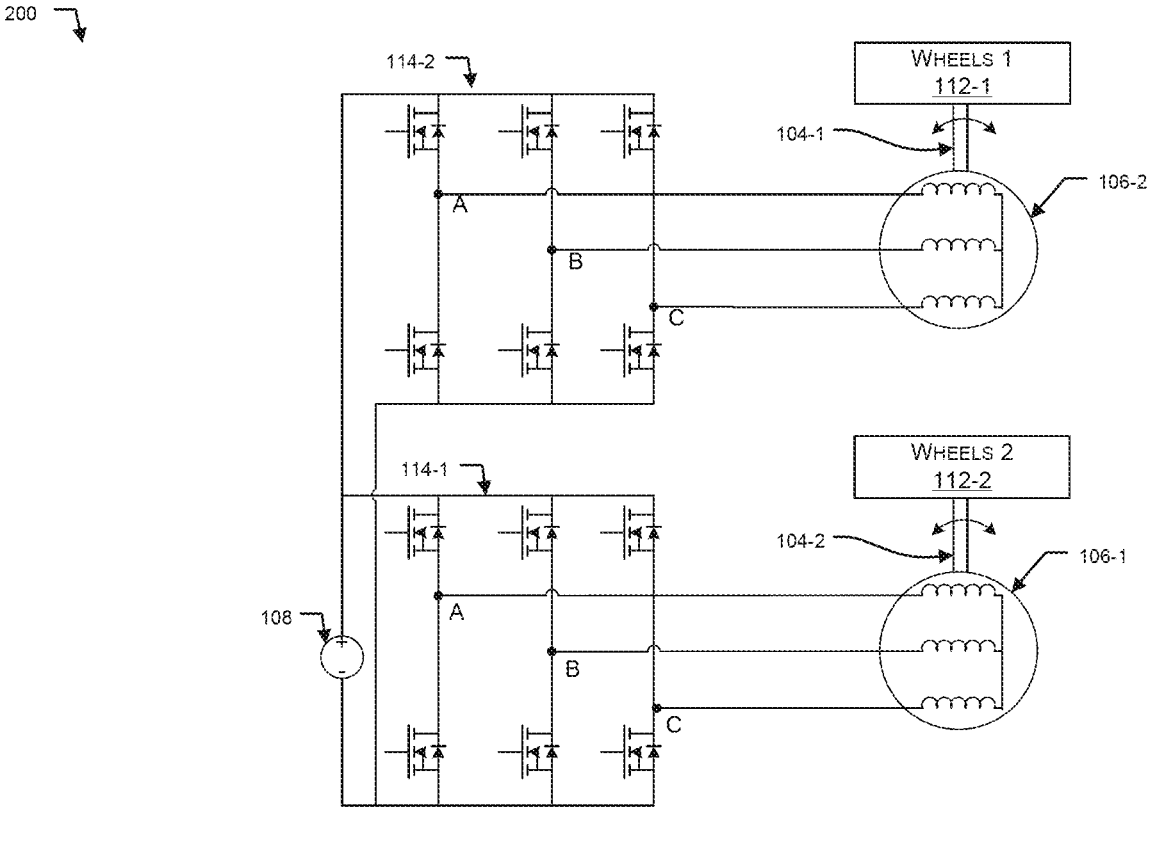
FIG. 2 shows a circuit diagram of the multi-VFMM configuration in a plurality of orientations, according to one or more embodiments.

In some embodiments, each VFMM, or a subset of VFMMs, from the set of VFMMs (106) may be connected to a corresponding inverter (114). As shown in FIG. 2, the first VFMM (106-1) and the second VFMM (106-2) may be connected to a first inverter (114-1) and a second inverter (114-2), respectively. The controller (110) may be configured to operably engage a subset of inverters from the one or more inverters (114) to electric power to pass therethrough, based on the power requirements. In such embodiments, the controller (110) may be configured to operably engage the subset of inverters to increase the power ratings in proportion to electric power required for fulfilling the power requirements. In some examples, the first and the second inverters (114-1, 114-2) may be configured to supply electric power to the VFMMs (106).

In some embodiments, the controller (110) may be configured to selectively change a magnetization state of one or more VFMMs from the set of VFMMs (106) based on power requirements, thereby selectively engaging or disengaging the VFMMs (106) based on power requirements. In some embodiments, the controller (110) may include a processor (e.g., a Central Processing Unit (CPU)) coupled to a memory (e.g., a Random Access Memory (RAM)). The memory may have one or more processor-executable instructions for selectively changing the magnetization states of the VFMMs (106). In some embodiments, the controller (110) may be indicative of on-board electronics, such as an Electronic Control Unit, or a Vehicle Control Unit (VCU).

In some embodiments, to change the magnetization state, the controller (110) may be configured to receive the power requirements. The power requirements may be indicative of speed and torque required on the drivetrains (104). In some embodiments, the controller (110) may be configured to receive inputs indicative of power requirements from a user of the vehicle (102) through one or more interfaces (not shown). The interfaces may be any one or combination of including, but not limited to, a shift knob, a button, a grip shift, a foot pedal, a rotary knob, a voice command receiver, biomedical implants, and the like. In other embodiments, the controller (110) may receive indications of the power requirements through one or more sensors (not shown) that transmit one or more environmental parameters thereto. The environmental parameters may be any one or combination of including, but not limited to, rain detection parameters, surface friction parameters, temperature parameters, tire pressure parameters, surface gradient parameters, component health parameters, suspension compression parameters, and the like. In such embodiments, the controller (110) may be configured to infer the power requirements based on the one or more environmental parameters. In other embodiments, the controller (110) may be configured to determine the power requirements based on a combination of the inputs from the one or more interfaces, and the one or more environmental parameters from the sensors.

In some embodiments, the controller (110) may be configured to determine an optimal magnetization configuration for the set of VFMMs (106) based on the power requirements. In some embodiments, the optimal magnetization configuration may be indicative of a combination of magnetization states of each VFMM in the set of VFMMs (106) that is optimal for fulfilling the power requirements, but not limited to. In some embodiments, the controller (110) may be configured to determine the optimal magnetization configuration based on the power requirements falling between a predetermined set of threshold ranges. In such embodiments, a combination of magnetization states of each of the VFMMs (106) may be determined for each of the threshold ranges such that for every power requirement falling within any one of the threshold ranges, there exists at least one combination of magnetization state that optimally/efficiently fulfills the power requirements.

In some embodiments, the controller (110) may be configured to demagnetize a first subset of VFMMs from the set of VFMMs (106), such as the first VFMM (106-1), and magnetize a second subset of VFMMs from the set of VFMMs (106), such as the second VFMM (106-2), when the power requirements are below a predetermined threshold. In such embodiments, the controller (110) may be configured to turn off the inverter (114) associated with the first subset of VFMMs therefrom to prevent the stators thereof from producing magnetic fields. Further, in such embodiments, the controller (110) may be configured to connect the second subset of VFMMs with the associated axles (104), or retain connection of the second subset of VFMMs. In some examples, the power requirement may be below the predetermined threshold when the user is driving the vehicle (102) in cities where speed and power requirements may be lower. In such embodiments, the first subset of VFMMs, since they are demagnetized, the first subset of VFMMs may minimize or eliminate any rollover losses therefrom. In such embodiments, the stator may be de-energized. Meanwhile, the second subset of VFMMs may continue to interact with the magnetic field of the stator, and may propel the drivetrains (104) corresponding to the power requirements. When the power requirements exceed the predetermined threshold, the controller (110) may be configured to magnetize the first subset of VFMMs to fulfill the power requirements of the user. In some embodiments, where speed and power requirements may be higher, such as when the user moves from city roads to a freeway, or requires the vehicle (102) to perform an uphill climb, for example, the controller (110) may magnetize the first subset of VFMMs to allow both subsets of VFMMs to engage with and provide power to the wheels, thereby causing it to interact with the magnetic fields produced by the corresponding stators, and generate additional torque or speed to fulfill the power requirements.

In some embodiments, one or more of the VFMMs from the set of VFMMs (106) may be either fully or partially (de)magnetized based on the power requirements. In such embodiments, the one or more VFMMs may be magnetized in a combination that allows the system (101) to achieve a target efficiency (or power efficiency).

In some embodiments, the optimal magnetization configuration may be determined based on the specifications of each of the VFMMs (106). In some examples, the first VFMM (106-1) with a higher number of turns may be configured to generate more torque, but less speed, than the second VFMM (106-2) which has a comparatively lower number of turns. In such examples, when the power requirements indicate a need for torque, the controller (110) may be configured to demagnetize the second VFMM (106-2) and magnetize the first VFMM (106-1). In other examples when the power requirements indicate a need for increased speed (such as greater than a predefined speed threshold), the first VFMM (106-1) may be demagnetized and the second VFMM (106-2) may be magnetized to provide speed greater than the predefined threshold more efficiently. In yet other examples, the first and the second VFMMs (106-1, 106-2) may be partially magnetized in a proportion appropriate to provide torque and speed corresponding to the power requirements.

In such embodiments, the controller (110) may determine a combination of magnetization states each VFMM in the set of VFMMs (106) may have for a given power requirement in-real time. In other embodiments, the controller (110) may retrieve, from a database coupled thereto, a combination of magnetization states each VFMM in the set of VFMMs (106) may have for the given power requirement, that has been predetermined and stored in the database. In such embodiments, the combinations of magnetization states may be stored in the database, and may be retrieved by matching an entry corresponding to the power requirement.

In other embodiments, the optimal magnetization configuration may be indicative of a combination of magnetization states of the VFMMs (106) that provides power corresponding to the power requirements within the target efficiency. In such embodiments, the controller (110) may be configured to adjust the magnetization states of the VFMMs (106) based on the power requirements, without disconnecting the VFMMs (106) from the corresponding inverters (114). The controller (110) may select the optimal magnetization configuration for the VFMMs (106) to maximize the efficiency of power delivery. In some examples, the controller (110) may be configured to increase the magnetization states of the first subset of VFMMs configured to drive the front wheels (112-1, 112-2) and decrease the magnetization states of the second subset of VFMMs configured to drive the rear wheels (112-3, 112-4) during acceleration, and vice-versa during uphill climbs. In such examples, the VFMMs (106) may cumulatively provide torque and speed corresponding to the power requirements, while optimizing the power consumption thereof.

In some embodiments, the controller (110) may be configured to transmit a demagnetization pulse or a magnetization pulse to the one or more VFMMs in the set of VFMMs (106) to match the optimal magnetization configuration corresponding to the power requirements. In some embodiments, the demagnetization pulse and the magnetization pulse may be indicative of negative d-axis current pulses and positive d-axis current pulses, respectively, of a predetermined duration. The predetermined duration may correspond to the duration of pulses required to shift the VFMMs (106) from a current magnetization state to a desired magnetization state. The desired magnetization state may be determined based on the optimal magnetization configuration. In some embodiments, the demagnetization pulse and the magnetization pulse are transmitted through the inverter (114) corresponding to the VFMMs (106) for which the magnetization states thereof have to be changed.

In some embodiments, the controller (110) may be configured with fault-tolerance functionalities. During faults (such as short circuit currents), the VFMMs (106) may be demagnetized by the short-circuit currents. In such embodiments, the system (101) may ensure the vehicle (102) remains operational, while also allowing the allowing the VFMMs (106) to be recoverable.

FIG. 2 shows a circuit diagram (200) of the system (101), according to one or more embodiments. FIG. 2 illustrates a configuration where the inverters (114-1, 114-2) are connected to the corresponding VFMMs (106). In such embodiments, the system (101) may be configured to transmit power through the drivetrains (104) to rotate the wheels (112), and thereby propel the vehicle (102). The power with which each of the VFMMs (106) drives its corresponding drivetrain may depend on the magnetization states thereof. In some embodiments, the controller (110) may selectively adjust the magnetization states of each of the connected VFMMs (106) based on the optimal magnetization configuration.

Figure 3A:
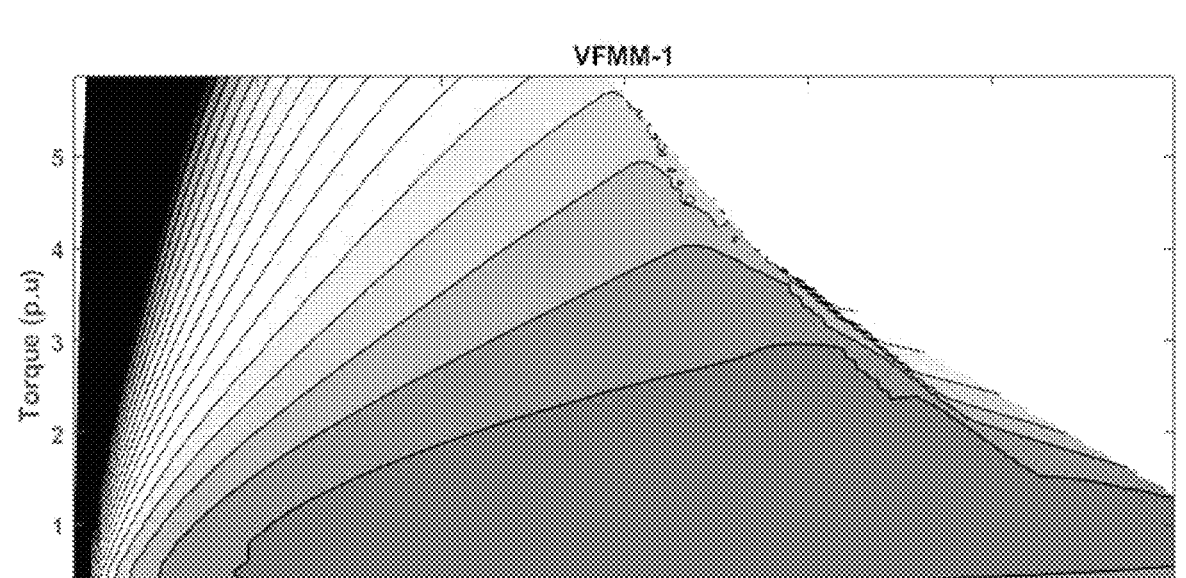
FIGS. 3A-3C show efficiency maps of a system having the multi-VFMM configuration, according to one or more embodiments.
Figure 3B:
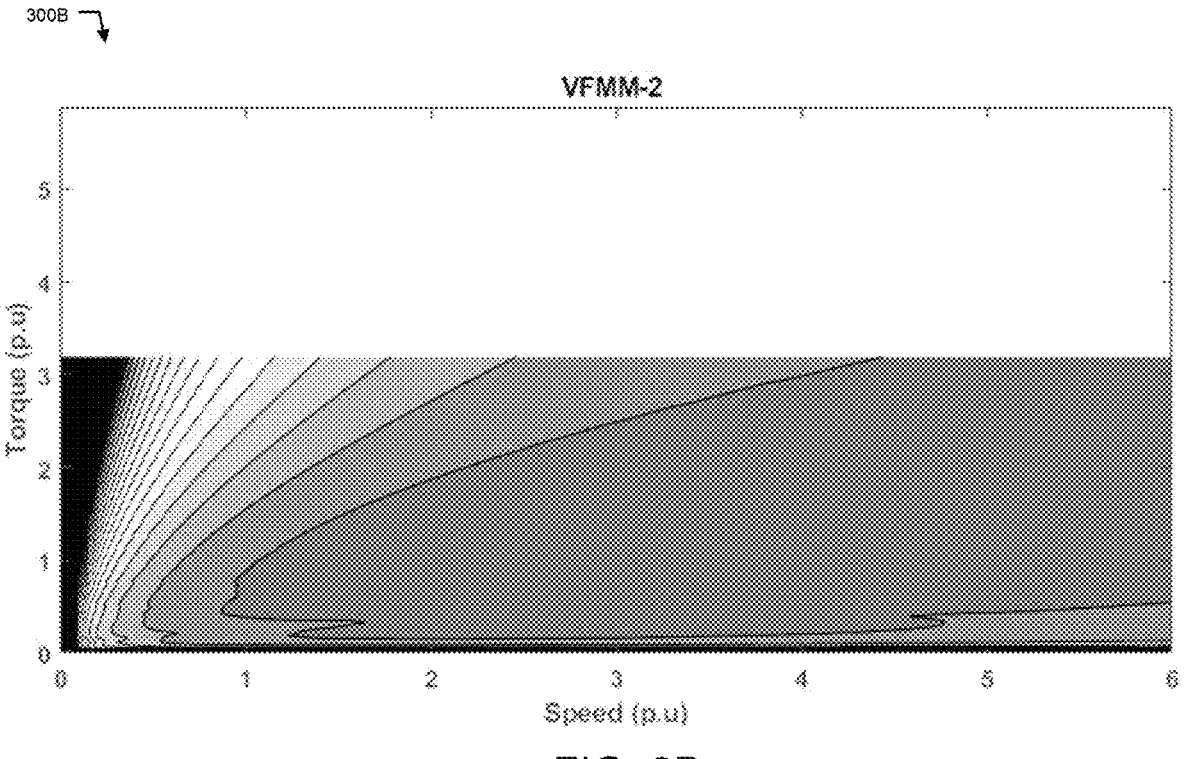
Figure 3C:
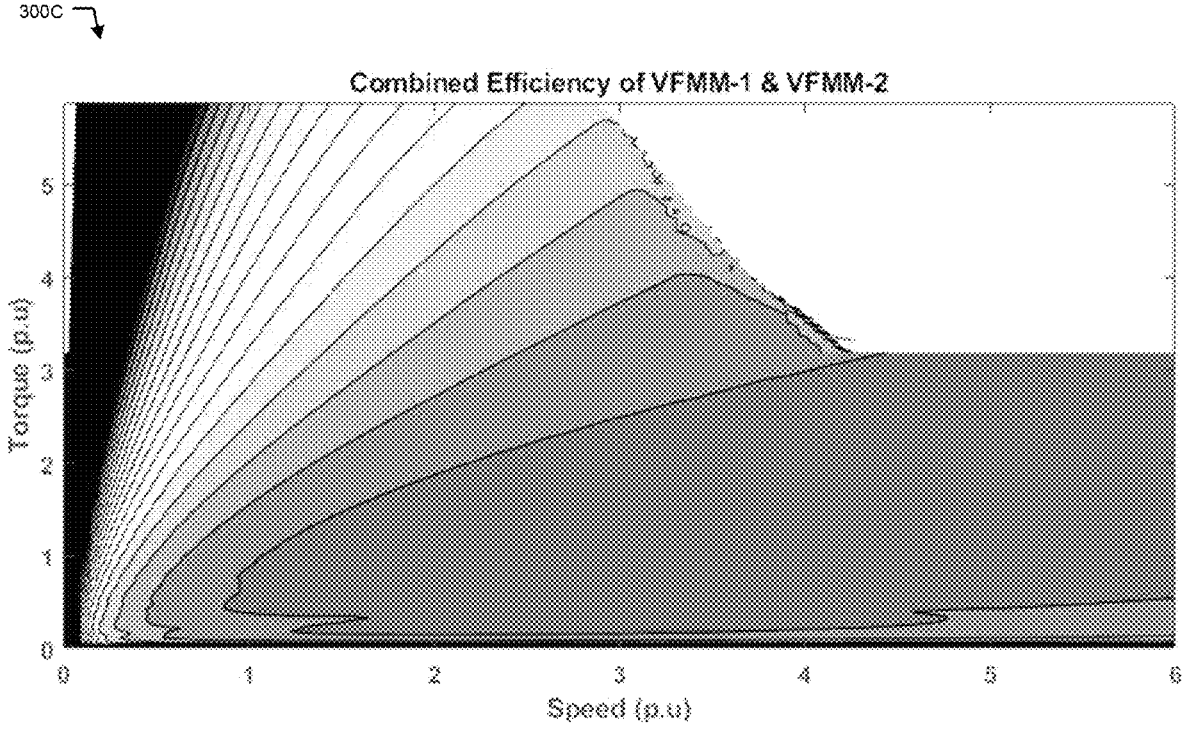

FIGS. 3A-3C show efficiency maps (300A, 300B, 300C) of the set of VFMMs (106), according to one or more embodiments. FIG. 3A shows the efficiency map (300A) of the first subset of VFMMs, FIG. 3B shows the efficiency map (300B) of the second subset of VFMMs, and FIG. 3C shows the combined efficiency map (300C) of the first and the second subsets of the VFMMs. The efficiency maps (300A, 300B, 300C) show the power efficiency of the set of VFMMs (106) with respect to speed and torque output from the VFMMs (106). Darker shades of gray indicate higher efficiency for power requirements with respect to speed and torque provided in X-axis and Y-axis, respectively. Drive cycle average efficiency, indicative of energy requirement, of the set of VFMMs (106), may be determined by calculating the Watt/hour consumed and the range at each drive cycle using coefficient of rolling resistance, drag coefficient, velocity and acceleration of the vehicle (102), torque and speed provided by the VFMMs (106), motor efficiencies determined using a loss models, and other vehicle parameters. As shown, the first and the second subsets of VFMMs may have different configurations/specifications suitably adapted for providing efficient power output based on power requirements. For example, the first subset of VFMMs may be adapted to provide increased efficiency for high-torque applications in comparison to the second subset of VFMMs, while the second subset of VFMMs may be adapted to provide increased efficiency for high-speed applications in comparison to the first subset of VFMMs. The power (torque and/or speed) efficiency of the VFMMs (106) may be suitably adapted by modifying the amount of coil windings, for example, used in the stator thereof. In some examples, the VFMMs (106) that are optimized to provide efficient speed output may have lower number of turns in comparison to the VFMMs (106) that are optimized to provide efficient torque output, which may have higher number of turns in its coils. The geometry, dimensions, and/or the number turns of the stator or the rotor in each of the VFMMs (106) may also be suitably adapted to provide different speed outputs and power outputs.

When the first and the second subsets of VFMMs are used in combination of the other, they may be able to provide torque and speed outputs with increased efficiency over a broader range of power requirements. In some examples, since the first subset of VFMMs provide increased efficiency while providing higher amounts of torque (as shown in efficiency map (300A)), in comparison to the second set of VFMMs, the first subset of VFMMs may be engaged when the user requires an increased amount of torque. Similarly, since the second subset of VFMMs provides increased efficiency while providing higher amounts of speed (as shown in efficiency map (300B)), in comparison to the first set of VFMMs, the second subset of VFMMs may be engaged when the user requires an increased amount of speed.

In some embodiments, by using VFMMs (106) with operably (de)magnetizable rotor magnets, the system (101) may eliminate the need for a clutch or axle disconnect means to disengage motors from the corresponding drivetrain (104). In such embodiments, the system (101) may benefit from reduction of cost, space, and weight associated with installing such clutches or axle disconnect means. Eliminating such components also reduces complexities associated with operably engaging and disengaging motors based on the power requirements, thereby increasing reliability of the system (101) and minimizing risk of failure. Use of a plurality of VFMMs (106) having different configurations may also provide for a wider range of operating power requirements. Since each of the VFMMs (106) can be optimized for different operating ranges, the controller (110) may selectively modify magnetization states of (or disconnect) the VFMMs (106) corresponding to the power requirements received from the users. Further, the system (101) may simplify the supply chain, manufacturing, and maximize inventory utilization. Additionally, the energy efficiencies of the set of VFMMs (106) at each drive cycle may allow for a reduction in battery capacities and sizes, which further reduces the weight of the vehicle (102).

FIG. 4 illustrates a flowchart of a method (400) for controlling a set of VFMMs based on power requirements, according to one or more embodiments of the present disclosure.

At block 402, the method (400) includes receiving, by a controller, power requirements from one or more interfaces.

At block 404, the method (400) includes determining, by the controller, an optimal magnetization configuration for the set of VFMMs based on the power requirements.

At block 404, the method (400) includes transmitting, by the controller, a demagnetization pulse or a magnetization pulse to one or more VFMMs in the set of VFMMs to match the optimal magnetization configuration corresponding to the power requirements.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A vehicle system operably functioning with mechanical energy and electrical energy, the vehicle comprising:
   at least one drivetrain having at least one axle;
   a set of Variable Flux Memory Motors (VFMMs) coupled with the at least one drivetrain, the set of VFMMs being configured to convert the mechanical energy from the at least one drivetrain into the electrical energy; and
   a controller configured to selectively change a magnetization state of at least two of the set of VFMMs, wherein the selective change includes electromagnetically disconnecting the at least one axle through the at least two of the set of VFMMs.

2. The system of claim 1, wherein each VFMM of the set of VFMMs comprises a multi-phase winding configured to receive multi-phase electric power.

3. The system of claim 1, further comprising:

a battery; and at least one or more inverters configured between the battery and inverter coupled with the set of VFMMs, the at least one inverter being configured to conduct the electric energy with the set of VFMMs.

4. The system of claim 3, wherein the controller is configured to operably allow the electrical energy to conduct through a subset of inverters of the at least one inverter based on the set of VFMMs.

5. The system of claim 1, wherein the controller is configured to:

receive power requirements;

determine at least one magnetization configuration for the set of VFMMs based on the power requirements; and transmit a pulse to the at least one VFMM of the set of VFMMs to match the at least one magnetization configuration corresponding with the power requirements.

6. The system of claim 5, wherein the pulse comprises at least one of a negative d-axis current pulse and a positive d-axis current pulse.

7. The system of claim 5, wherein an inverter transmits the with the at least one VFMM.

8. The system of claim 5, wherein at least one interface receives the power requirements indicative of speed and torque from the at least one drivetrain.

9. The system of claim 5, wherein the at least one magnetization configuration is operably indicative of at least one magnetization state for each VFMM of the set of VFMMs.

10. The system of claim 9, wherein the at least one magnetization-state operably provides power corresponding to at least one efficiency range.

11. The system of claim 9, wherein the controller is configured to determine the at least one magnetization configuration based on the power requirements falling between a set of thresholds.

12. The system of claim 5, wherein the at least one VFMM comprise at least one of a fully magnetized, a partially magnetized, and a demagnetized configuration corresponding with the power requirements.

13. The system of claim 5, wherein the pulse comprises at least one of a magnetization signal and a demagnetization signal.

14. The system of claim 1, wherein each VFMM of the set of VFMMs comprises a different specification configured to operate at a corresponding power requirement.

15. The system of claim 1, wherein the controller being configured to enable the at least two of the set of VFMMs to cooperate and demagnetize the drive train to disconnect the at least one axle.

16. A method for controlling a set of Variable Flux Memory Motors (VFMMs) in a vehicle having at least one drivetrain with at least one axle, the method comprising:

receiving, by a controller, power requirements from at least one interfaces;

determining, by the controller, at least one magnetization configuration for the set of VFMMs corresponding with the power requirements;

transmitting, by the controller, a pulse to at least one VFMM in the set of VFMMs to match the magnetization configuration corresponding to the power requirements; and selectively changing a magnetization state for each of at least two of the set of VFMMs by the controller to operably electromagnetically disconnect the at least one axle.

17. The method of claim 16, wherein the pulse comprises at least one of a magnetization signal and a demagnetization signal.

18. A method for controlling a set of Variable Flux Memory Motors (VFMMs) based on power requirements in a vehicle having at least one drivetrain with at least one axle, comprising:

receiving, by a controller, power requirements from at least one interfaces;

determining, by the controller, at least one magnetization configuration for the set of VFMMs corresponding with the power requirements; and transmitting, by the controller, a pulse to at least one VFMM in the set of VFMMs to match the magnetization configuration corresponding to the power requirement;

selectively changing a magnetization state for at least two VFMMs of the set of VFMMs in response to the transmitted pulse to least one VFMMs;

demagnetizing the drive train in response to the selective changing of the magnetization state for each of the VFMMs; and operably disconnecting the axle electromagnetically in response to demagnetizing the drive train.

* * * * *